US008628405B2

(12) United States Patent
Gelber et al.

(10) Patent No.: US 8,628,405 B2
(45) Date of Patent: Jan. 14, 2014

(54) GAMING SYSTEM HAVING EXCHANGEABLE BONUS TOKEN ACCUMULATION-REDEMPTION FEATURE

(75) Inventors: Philip B. Gelber, Glen Ellyn, IL (US); Thomas M. Kopera, Villa Park, IL (US); Michael W. Mastropietro, Chicago, IL (US); Richard T. Schwartz, Chicago, IL (US); Matthew J. Ward, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 1099 days.

(21) Appl. No.: 11/664,773

(22) PCT Filed: Oct. 7, 2005

(86) PCT No.: PCT/US2005/036151

§ 371 (c)(1), (2), (4) Date: Apr. 5, 2007

(87) PCT Pub. No.: WO2006/044252

PCT Pub. Date: Apr. 27, 2006

(65) Prior Publication Data

US 2008/0113770 A1 May 15, 2008

Related U.S. Application Data

(60) Provisional application No. 60/619,065, filed on Oct. 15, 2004.

(51) Int. Cl.
*A63F 13/00* (2006.01)

(52) U.S. Cl.
USPC .................................. 463/25; 463/16; 463/20

(58) Field of Classification Search
USPC ................................................ 463/16, 20, 25
See application file for complete search history.

(56) References Cited

U.S. PATENT DOCUMENTS

| | | | | |
|---|---|---|---|---|
| 4,752,068 | A | 6/1988 | Endo | 273/1 |
| 5,575,474 | A | 11/1996 | Rossides | 463/26 |
| 5,609,525 | A | 3/1997 | Ohno et al. | 463/43 |
| 5,639,088 | A | 6/1997 | Schneider et al. | 273/138.2 |
| 5,655,961 | A | 8/1997 | Acres et al. | 463/27 |
| 5,833,537 | A | 11/1998 | Barric | 463/21 |

(Continued)

FOREIGN PATENT DOCUMENTS

| | | | |
|---|---|---|---|
| EP | 1 513 114 A2 | 3/2005 | G06F 17/32 |
| WO | WO 98/52665 | 11/1998 | A63F 9/24 |

(Continued)

OTHER PUBLICATIONS

International Search Report for Serial No. PCT/US 05/36151 dated Aug. 16, 2006.

*Primary Examiner* — William H McCulloch, Jr.
(74) *Attorney, Agent, or Firm* — Nixon Peabody LLP

(57) ABSTRACT

A gaming terminal is utilized for playing a wagering game. The gaming terminal includes a wager-input device and a display for displaying the wagering game. The wagering game includes a randomly-selected outcome selected from a plurality of outcomes in response to a wager input received via the wager-input device. The plurality of outcomes include at least one outcome that awards standard credits and bonus tokens. A credit output device outputs a value of the standard credits and the bonus tokens in response to achieving the at least one outcome. The bonus tokens are exchangeable for a special event on a second gaming terminal.

19 Claims, 6 Drawing Sheets

(56) References Cited

U.S. PATENT DOCUMENTS

| | | | | |
|---|---|---|---|---|
| 5,833,540 | A | 11/1998 | Miodunski et al. | 463/42 |
| 5,851,148 | A | 12/1998 | Brune et al. | 463/25 |
| 5,957,775 | A | 9/1999 | Cherry | 463/16 |
| 6,004,211 | A | 12/1999 | Brenner et al. | 463/40 |
| 6,012,045 | A | 1/2000 | Barzilai | 705/37 |
| 6,012,983 | A | 1/2000 | Walker et al. | 463/20 |
| 6,015,344 | A * | 1/2000 | Kelly et al. | 463/16 |
| 6,068,553 | A | 5/2000 | Parker | 463/27 |
| 6,077,163 | A | 6/2000 | Walker et al. | 463/26 |
| 6,113,098 | A | 9/2000 | Adams | 273/143 R |
| 6,165,071 | A | 12/2000 | Weiss | 463/24 |
| 6,183,362 | B1 | 2/2001 | Boushy | 463/25 |
| 6,190,255 | B1 * | 2/2001 | Thomas et al. | 463/20 |
| 6,227,972 | B1 | 5/2001 | Walker et al. | 463/25 |
| 6,234,896 | B1 | 5/2001 | Walker et al. | 463/16 |
| 6,244,958 | B1 | 6/2001 | Acres | 463/26 |
| 6,254,481 | B1 | 7/2001 | Jaffe | 463/20 |
| 6,254,483 | B1 | 7/2001 | Acres | 463/26 |
| 6,273,820 | B1 | 8/2001 | Haste, III | 463/40 |
| 6,302,790 | B1 | 10/2001 | Brossard | 463/20 |
| 6,311,976 | B1 | 11/2001 | Yoseloff et al. | 273/138 |
| 6,319,127 | B1 | 11/2001 | Walker et al. | 463/26 |
| 6,322,309 | B1 * | 11/2001 | Thomas et al. | 413/20 |
| 6,364,765 | B1 | 4/2002 | Walker et al. | 463/16 |
| 6,364,766 | B1 | 4/2002 | Anderson et al. | 463/16 |
| 6,365,765 | B1 | 4/2002 | Baldwin et al. | 556/440 |
| 6,371,852 | B1 | 4/2002 | Acres | 463/25 |
| 6,379,248 | B1 | 4/2002 | Jorasch et al. | 463/25 |
| 6,422,940 | B1 | 7/2002 | Walker et al. | 463/13 |
| 6,431,983 | B2 | 8/2002 | Acres | 463/25 |
| RE37,885 | E | 10/2002 | Acres et al. | 463/42 |
| 6,506,117 | B2 | 1/2003 | DeMar | 463/20 |
| 6,506,118 | B1 | 1/2003 | Baerlocher et al. | 463/25 |
| 6,558,255 | B2 | 5/2003 | Walker et al. | 463/25 |
| 6,575,832 | B1 | 6/2003 | Manfredi et al. | 463/25 |
| 6,645,074 | B2 * | 11/2003 | Thomas et al. | 463/20 |
| 6,648,757 | B1 * | 11/2003 | Slomiany et al. | 463/20 |
| 6,663,489 | B2 | 12/2003 | Baerlocher | 463/20 |
| 6,712,697 | B2 | 3/2004 | Acres | 463/25 |
| 6,722,981 | B2 | 4/2004 | Kaminkow | 463/20 |
| 6,722,985 | B2 | 4/2004 | Criss-Puszkiewicz et al. | 463/29 |
| 6,745,236 | B1 | 6/2004 | Hawkins et al. | 709/203 |
| 6,758,757 | B2 | 7/2004 | Luciano, Jr. et al. | 463/43 |
| 6,776,711 | B1 | 8/2004 | Baerlocher | 463/16 |
| 6,776,713 | B2 | 8/2004 | Gauselmann | 463/16 |
| 6,780,111 | B2 | 8/2004 | Cannon et al. | 463/25 |
| 6,800,027 | B2 | 10/2004 | Giobbi et al. | 463/24 |
| 6,800,030 | B2 | 10/2004 | Acres | 463/25 |
| 6,811,486 | B1 | 11/2004 | Luciano, Jr. | 463/24 |
| 6,875,106 | B2 | 4/2005 | Weiss et al. | 463/20 |
| 6,878,063 | B2 | 4/2005 | Manfredi et al. | 463/25 |
| 6,896,618 | B2 | 5/2005 | Benoy et al. | 463/25 |
| 6,905,412 | B2 * | 6/2005 | Thomas et al. | 463/25 |
| 6,923,721 | B2 | 8/2005 | Luciano et al. | 463/24 |
| RE38,812 | E | 10/2005 | Acres et al. | 463/26 |
| 7,025,674 | B2 | 4/2006 | Adams et al. | 463/1 |
| 7,063,617 | B2 | 6/2006 | Brosnan et al. | 463/25 |
| 7,182,690 | B2 | 2/2007 | Giobbi et al. | 463/24 |
| 7,901,283 | B2 * | 3/2011 | Thomas et al. | 463/20 |
| 8,043,152 | B2 * | 10/2011 | Walker et al. | 463/16 |
| 8,087,995 | B2 * | 1/2012 | Englman et al. | 463/23 |
| 8,192,276 | B2 * | 6/2012 | Walker et al. | 463/25 |
| 8,216,062 | B2 * | 7/2012 | Baerlocher et al. | 463/25 |
| 8,308,556 | B2 * | 11/2012 | Thomas | 463/25 |
| 8,317,620 | B2 * | 11/2012 | Kelly et al. | 463/42 |
| 8,371,919 | B2 * | 2/2013 | Hornik et al. | 463/16 |
| 8,425,323 | B2 * | 4/2013 | Fiden et al. | 463/42 |
| 8,449,386 | B2 * | 5/2013 | Englman et al. | 463/26 |
| 8,480,480 | B2 * | 7/2013 | Thomas et al. | 463/20 |
| 8,506,394 | B2 * | 8/2013 | Kelly et al. | 463/29 |
| 8,535,145 | B2 * | 9/2013 | Walker et al. | 463/25 |
| 2001/0024971 | A1 | 9/2001 | Brossard | 463/30 |
| 2001/0046893 | A1 | 11/2001 | Giobbi et al. | 463/24 |
| 2002/0028708 | A1 | 3/2002 | Busch et al. | 463/42 |
| 2002/0039919 | A1 | 4/2002 | Joshi et al. | 463/20 |
| 2002/0077173 | A1 | 6/2002 | Luciano, Jr. et al. | 463/23 |
| 2002/0077174 | A1 | 6/2002 | Luciano et al. | 463/25 |
| 2002/0093136 | A1 | 7/2002 | Moody | 273/139 |
| 2002/0094871 | A1 | 7/2002 | Luciano, Jr. et al. | 463/43 |
| 2002/0107065 | A1 | 8/2002 | Rowe | 463/20 |
| 2002/0142846 | A1 | 10/2002 | Paulsen | 463/43 |
| 2002/0151349 | A1 | 10/2002 | Joshi | 463/20 |
| 2002/0196342 | A1 | 12/2002 | Walker et al. | 348/157 |
| 2003/0013515 | A1 | 1/2003 | Rowe et al. | 463/25 |
| 2003/0013531 | A1 | 1/2003 | Rowe et al. | 463/42 |
| 2003/0032474 | A1 | 2/2003 | Kaminkow | 463/25 |
| 2003/0036422 | A1 | 2/2003 | Baerlocher et al. | 463/20 |
| 2003/0036427 | A1 | 2/2003 | Brandstetter et al. | 463/29 |
| 2003/0064794 | A1 | 4/2003 | Mead et al. | 463/25 |
| 2003/0078101 | A1 | 4/2003 | Schneider et al. | 463/42 |
| 2003/0100357 | A1 * | 5/2003 | Walker et al. | 463/16 |
| 2003/0100362 | A1 | 5/2003 | Horniak et al. | 463/25 |
| 2003/0106769 | A1 | 6/2003 | Weiss | 463/21 |
| 2003/0114219 | A1 | 6/2003 | McClintic | 463/25 |
| 2003/0119579 | A1 * | 6/2003 | Walker et al. | 463/20 |
| 2003/0157979 | A1 | 8/2003 | Cannon et al. | 463/16 |
| 2003/0195024 | A1 | 10/2003 | Slattery | 463/9 |
| 2003/0211881 | A1 | 11/2003 | Walker et al. | 463/20 |
| 2004/0053680 | A1 | 3/2004 | Schultz | 463/20 |
| 2004/0106448 | A1 | 6/2004 | Gauselmann | 463/25 |
| 2004/0142742 | A1 | 7/2004 | Schneider et al. | 463/25 |
| 2004/0209662 | A1 | 10/2004 | Wadleigh | 463/16 |
| 2004/0235552 | A1 | 11/2004 | Gauselmann | 463/16 |
| 2005/0003886 | A1 | 1/2005 | Englman et al. | 463/25 |
| 2005/0003887 | A1 | 1/2005 | Seelig | 463/25 |
| 2005/0054439 | A1 | 3/2005 | Rowe et al. | 463/29 |
| 2005/0059480 | A1 | 3/2005 | Soukup et al. | 463/25 |
| 2005/0075889 | A1 | 4/2005 | Gomes et al. | 705/1 |
| 2005/0101374 | A1 | 5/2005 | Acres | 463/25 |
| 2005/0159207 | A1 | 7/2005 | Thomas | 463/20 |
| 2005/0221881 | A1 | 10/2005 | Lannert | 463/16 |
| 2006/0068893 | A1 | 3/2006 | Jaffe et al. | 463/20 |
| 2006/0079316 | A1 | 4/2006 | Flemming et al. | 463/25 |
| 2006/0079317 | A1 | 4/2006 | Flemming et al. | 463/20 |
| 2006/0084495 | A1 | 4/2006 | Jaffe et al. | 463/20 |
| 2006/0084496 | A1 | 4/2006 | Jaffe et al. | 463/20 |
| 2006/0089194 | A1 | 4/2006 | Joshi et al. | 463/25 |
| 2006/0116201 | A1 | 6/2006 | Gauselmann | 463/26 |
| 2006/0143085 | A1 | 6/2006 | Adams et al. | 705/14 |
| 2006/0160611 | A1 | 7/2006 | Okada | 463/25 |
| 2006/0211486 | A1 | 9/2006 | Walker et al. | 463/25 |
| 2006/0211487 | A1 | 9/2006 | Walker et al. | 463/25 |
| 2006/0211488 | A1 | 9/2006 | Walker et al. | 463/25 |
| 2007/0105613 | A1 | 5/2007 | Adams et al. | 463/16 |
| 2007/0111787 | A1 | 5/2007 | Adams et al. | 463/30 |
| 2007/0254734 | A1 | 11/2007 | Gilmore et al. | 463/20 |
| 2007/0259706 | A1 | 11/2007 | Anderson et al. | 463/16 |
| 2007/0259713 | A1 | 11/2007 | Fiden et al. | 463/25 |
| 2007/0265060 | A1 | 11/2007 | Hornik et al. | 463/20 |
| 2007/0298856 | A1 | 12/2007 | Gilmore et al. | 463/16 |
| 2008/0113770 | A1 * | 5/2008 | Gelber et al. | 463/25 |

FOREIGN PATENT DOCUMENTS

| | | | | |
|---|---|---|---|---|
| WO | WO 9929381 | | 6/1999 | A63F 7/00 |
| WO | WO 99/60498 | | 11/1999 | |
| WO | WO 01/83062 | A1 | 11/2001 | A63F 13/00 |
| WO | WO 01/83063 | A1 | 11/2001 | A63F 13/00 |
| WO | WO 03/013678 | A1 | 2/2003 | A63F 13/00 |
| WO | WO 03/025867 | A2 | 3/2003 | G07F 17/32 |
| WO | WO 03/026756 | A1 | 4/2003 | A63F 9/240 |
| WO | WO 2005/027063 | A1 | 3/2005 | G07F 17/32 |
| WO | WO 2005/029287 | A2 | 3/2005 | |
| WO | WO 2005082480 | | 9/2005 | A63F 13/00 |
| WO | WO 2006/004832 | A2 | 1/2006 | A63F 13/00 |
| WO | WO 2006/005073 | A2 | 1/2006 | |
| WO | WO 2006002241 | | 1/2006 | A63F 13/00 |
| WO | WO 2006004831 | | 1/2006 | A63F 13/00 |
| WO | WO 2006004832 | | 1/2006 | A63F 13/00 |
| WO | WO 2006005073 | | 1/2006 | |
| WO | WO 2006/017067 | A1 | 2/2006 | A63F 13/00 |
| WO | WO 2006/020413 | A1 | 2/2006 | G07F 17/32 |
| WO | WO 2006017036 | | 2/2006 | A63F 13/00 |
| WO | WO 2006017067 | | 2/2006 | A63F 13/00 |

(56) References Cited

FOREIGN PATENT DOCUMENTS

| | | | |
|---|---|---|---|
| WO | WO 2006017068 | 2/2006 | .............. A63F 13/00 |
| WO | WO 2006020811 | 2/2006 | ................ A63F 9/24 |
| WO | WO 2006026250 | 3/2006 | |
| WO | WO 2006044252 | 4/2006 | ................ A63F 9/24 |
| WO | WO 2007/103054 A2 | 9/2007 | .............. G06F 19/00 |
| WO | WO 2008/048634 A2 | 4/2008 | .............. A63F 13/06 |

* cited by examiner

GAMING SYSTEM HAVING EXCHANGEABLE BONUS TOKEN ACCUMULATION-REDEMPTION FEATURE

CROSS-REFERENCE TO RELATED APPLICATIONS

This application is a U.S. national phase of International Application No. PCT/US2005/036151, filed Oct. 7, 2005, which claims the benefit of priority of U.S. Provisional Patent Application No. 60/619,065, filed Oct. 15, 2004, both of which are incorporated by reference in their entirety.

FIELD OF THE INVENTION

The present invention relates generally to gaming terminals for playing a wagering game and, more particularly, to a gaming terminal having a feature for providing a bonus accumulation feature to allow a player to accumulate transportable bonus credits exchangeable for various gaming events at the gaming terminal or other gaming terminals.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming device(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

In current basic games, bonus games, and progressive games, the player is provided with little incentive to return the game at a later time. Once the player chooses to stop playing the game in that round, the player is immediately awarded any credits that are remaining and also loses assets that have been accumulated, but not yet awarded. For example, in some games, the bonus game consists of the player collecting assets and when a certain number or combination of assets is accumulated, the player wins an award. However, should the player choose to leave the game prior to winning the award, the player loses all of the assets accumulated. This can cause player frustration and does not provide the player with any incentive to return to the game.

Such a system also encourages "vulturing," in which the "vulturing" player waits for a person who is close to winning an award to leave the gaming machine prior to the winning of the award. The "vulturing" player then begins to play the machine, and may quickly win the award without investing much time into the game. This is also frustrating for other players.

Current wagering games have different payouts for various winning wagers, based on probabilities of certain random events occurring. Wagering games typically implement mathematical formulas ensuring a payout of less than 100% over time. Accordingly, each game or machine has different probabilities of certain bonus-related events occurring. Therefore, the probability of a bonus event occurring on a first game or terminal may be different than the probability of a bonus event occurring on a different game or terminal. Consequently, assets or bonuses earned in the first game or machine may be more valuable than assets/bonus earned in the second game or machine.

Thus, there is a need to allow a player to accumulate assets on gaming terminals and to have those assets restored to them should the player return to the game at a later time. This way, should a player choose to leave a game, anything the player has accumulated during the game goes with them and is restored at a later time when the player returns to the game. This alleviates the player frustration at losing assets that they have accumulated and also provides the player an incentive to return to the game at a later date. In addition, by allowing the player to accumulate credits, in the event that the player decides to end play on the game for any reason, the player would have additional incentive to continue playing the game at some point in the future to either accumulate more assets or use assets already accumulated, thereby further enhancing the player's enjoyment of the game. There is also a need to allow a player to transfer the accumulated assets to a different gaming terminal so that the player can continue to enjoy playing the game, or a different game, without losing any of the accumulated assets.

SUMMARY OF THE INVENTION

The present invention is directed to a gaming terminal for playing a wagering game. The gaming terminal includes a wager-input device and a display for displaying the wagering game. The wagering game includes a randomly-selected outcome selected from a plurality of outcomes in response to a wager input received via the wager-input device. The plurality of outcomes include at least one outcome that awards standard credits and bonus tokens. A credit output device outputs a value of the standard credits and the bonus tokens in response to achieving the at least one outcome. The bonus tokens are exchangeable for a special event on a second gaming terminal.

The present invention is further directed to a method of conducting a wagering game. A wager is received from a player. A game outcome is randomly selected from a plurality of outcomes in response to the wager. The plurality of outcomes include at least one outcome awarding standard credits and bonus tokens. The game outcome for the wagering game is then displayed. In response to the randomly selected outcome being the at least one outcome, a value of the accumulated standard credits and the bonus tokens is outputted. The bonus credits are exchangeable for a special event on a second gaming terminal.

The present invention is also directed to a gaming system. A first gaming terminal plays a first wagering game. The first wagering game including a randomly-selected outcome selected from a plurality of outcomes in response to a wager input received from a player. One of the plurality of outcomes includes at least one bonus-token outcome. In response to the player achieving the bonus-token outcome, the first gaming terminal provides the player with bonus tokens redeemable only for non-monetary events. A second gaming terminal plays a second wagering game that is different from the first wagering game. The second wagering game including a randomly-selected outcome selected from a plurality of outcomes. The second wagering game includes a special event that is activatable in response to the player presenting a predetermined value of the bonus tokens to the second gaming terminal.

The present invention is also directed to a gaming terminal for playing a wagering game. The gaming terminal includes a wager-input device and a display for displaying the wagering game. The wagering game includes a randomly-selected outcome selected from a plurality of outcomes in response to a wager input received via the wager-input device. The plurality of outcomes include at least one bonus-token outcome that allows a player to select between an option of receiving a certain value of standard credits or receiving bonus tokens that are redeemable for a special wagering event. A selection device allows a player to choose between the option in response to achieving the at least one bonus-token outcome.

The present invention is further directed to a method of playing a wagering game. A wagering input is received, and the wagering game is displayed. The wagering game includes a randomly-selected outcome selected from a plurality of outcomes in response to a wager input received via the wager-input device. The plurality of outcomes include at least one bonus-token outcome that allows a player to select between an option of receiving a certain value of standard credits or receiving bonus tokens that are redeemable for a special wagering event. A player is allowed to choose between the option in response to achieving the at least one bonus-token outcome.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
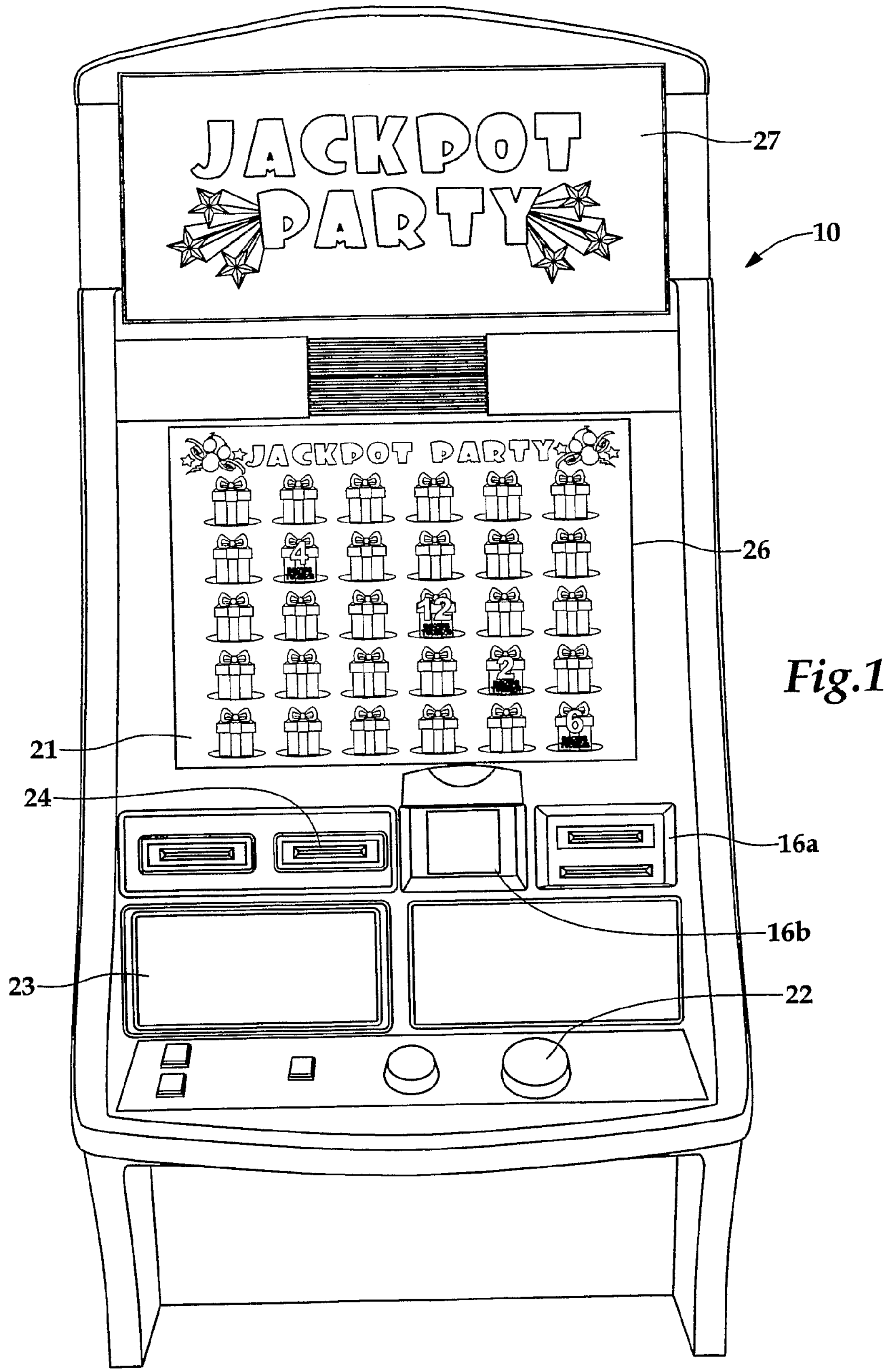
FIG. 1 is a perspective view of a video gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play video slots or a video casino game, such as blackjack, slots, keno, poker, etc.

As shown, the gaming terminal 10 includes input devices, such as a wager acceptor 16 (shown as a card wager acceptor 16*a* and a cash wager accepter 16*b*), a touch screen 21, a push-button panel 22, and an information reader 24. For outputs, the gaming terminal 10 includes a payout mechanism 23, a main display 26 for displaying information about the basic wagering game, and a secondary display 27 that may display an electronic version of a pay table, and/or also possibly game-related information or other entertainment features. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The cash wager acceptor 16*a* may include a coin slot acceptor or a note acceptor to input value to the gaming terminal 10. The card wager acceptor 16*b* may include a card-reading device for reading a card that has a recorded monetary value with which it is associated. The card wager acceptor 16*b* may also receive a card that authorizes access to a central account, which can transfer money to the gaming terminal 10.

Also included is the payout mechanism 23, which performs the reverse functions of the wager acceptor. For example, the payout mechanism 23 may include a coin dispenser or a note dispenser to output value from gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome, as well.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The information reader 24 may also include a keypad (not shown) for entering a personal identification number (PIN). The gaming terminal 10 may require that the player enter their PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

Figure 2:
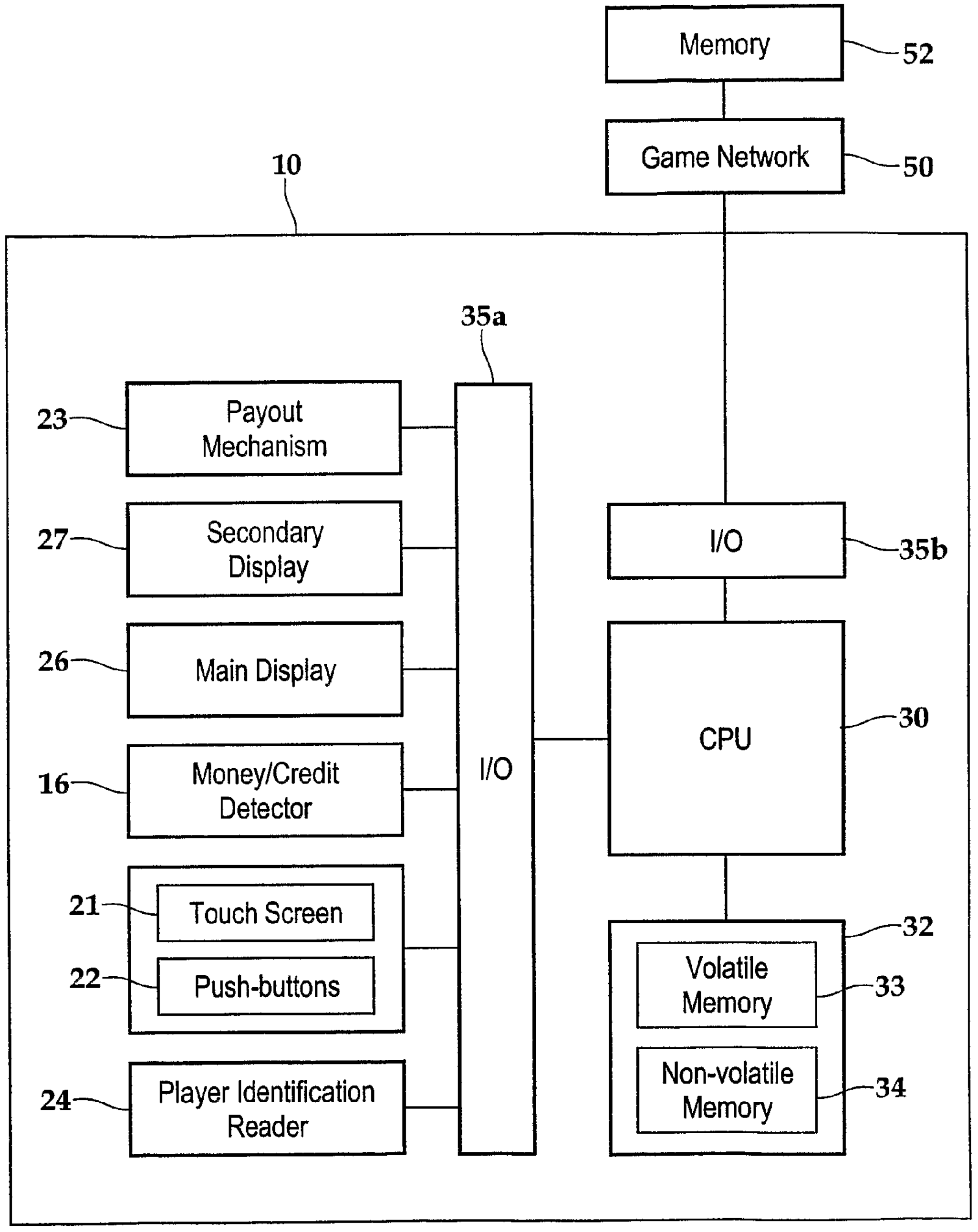
FIG. 2 is a block diagram of the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

In some embodiments, the CPU 30 may not be inside the gaming terminal 10. Instead, the CPU 30 may be part of a game network 50 (FIG. 2) and may be used to control numerous gaming terminals 10. In these embodiments, the CPU 30 will run the basic games for each of the gaming terminals 10, and may also be used to link the gaming terminals 10 together. The game network 50 can include progressive jackpots that are contributed to by all or some of the gaming terminals 10 in the network (e.g., terminal-level jackpots that only each terminal 10 contributes to, bank-level jackpots that are contributed to by all of the terminals 10 in a particular bank, and wide-area jackpots that are contributed to by a larger number of terminals 10, such as multiple banks). Alternatively, the game network 50 can allow the player to retrieve assets obtained while playing one terminal 10 at a different gaming terminal that is also part of the game network. Assets may be any number of things, including, but not limited to, monetary or non-monetary awards, features that a player builds up in a bonus or progressive game to win awards, etc.

In some embodiments, the CPU 30 is also used with the information reader 24 to restore saved assets. For example, in one embodiment, the information reader 24 is adapted to receive and distribute tickets (see FIG. 4). The tickets each include a unique identifier. The unique identifier links the ticket to a file contained within the local memory 32 or a system memory 52 located in the game network 50. The file includes the assets that are being stored from a previous game. Monetary awards include game credits or money, while the non-monetary awards can be bonus tokens, free plays (e.g., free spins), multipliers, or access to bonus and/or progressive games. The player may also be awarded the option of selecting between receiving a certain value of standard credits or receiving bonus tokens that are redeemable for a special wagering event.

When a player inserts a ticket into the information reader 24, the CPU 30 obtains the unique identifier and causes the appropriate memory 32, 52 to be searched, and the file containing the unique identifier matching the identifier on the ticket is retrieved. Any assets or other information contained in this file are then transmitted to the gaming terminal 10, and the player regains any assets that were saved during a previous game. This allows the player to keep assets even after a particular gaming session ends, which increases player commitment to a game and decreases vulturing.

In other embodiments, the information reader 24 may include a card reader, and the unique identifier provided at the gaming terminal 10 may be stored on a personal identification card, such as one described above. Or, the gaming terminal 10 includes a radio frequency identification device (RFID) transceiver or receiver so that an RFID transponder held by the player can be used to provide the unique identifier of the player at the gaming terminal 10 without the need to insert a card into the gaming terminal 10. RFID components can be those available from Pacific Northwest National Laboratory (under the United States Department of Energy) of Richland, Wash.

In other embodiments, the information reader 24 may include a biometric reader, such as a finger, hand, or retina scanner, and the unique identifier may be the scanned biometric information. Additional information regarding biometric scanning, such as fingerprint scanning or hand geometry scanning, is available from International Biometric Group LLC of New York, N.Y. Other biometric identification techniques can be used as well for providing a unique identifier of the player. For example, a microphone can be used in a biometric identification device on the gaming terminal so that the player can be recognized using a voice recognition system.

In summary, there are many techniques in which to provide a unique identifier for the player so that the assets accumulated by the player during one wagering session can be stored in either the system or local memory 52, 32, thereby allowing the player to subsequently access those assets at the same gaming terminal 10 or a different gaming terminal within the network 50. As described below with reference to FIGS. 3-7, various assets related to the wagering game features and formats can be stored after one gaming session and used in a subsequent gaming session(s) to enhance the gaming experience for the player.

Figure 3:
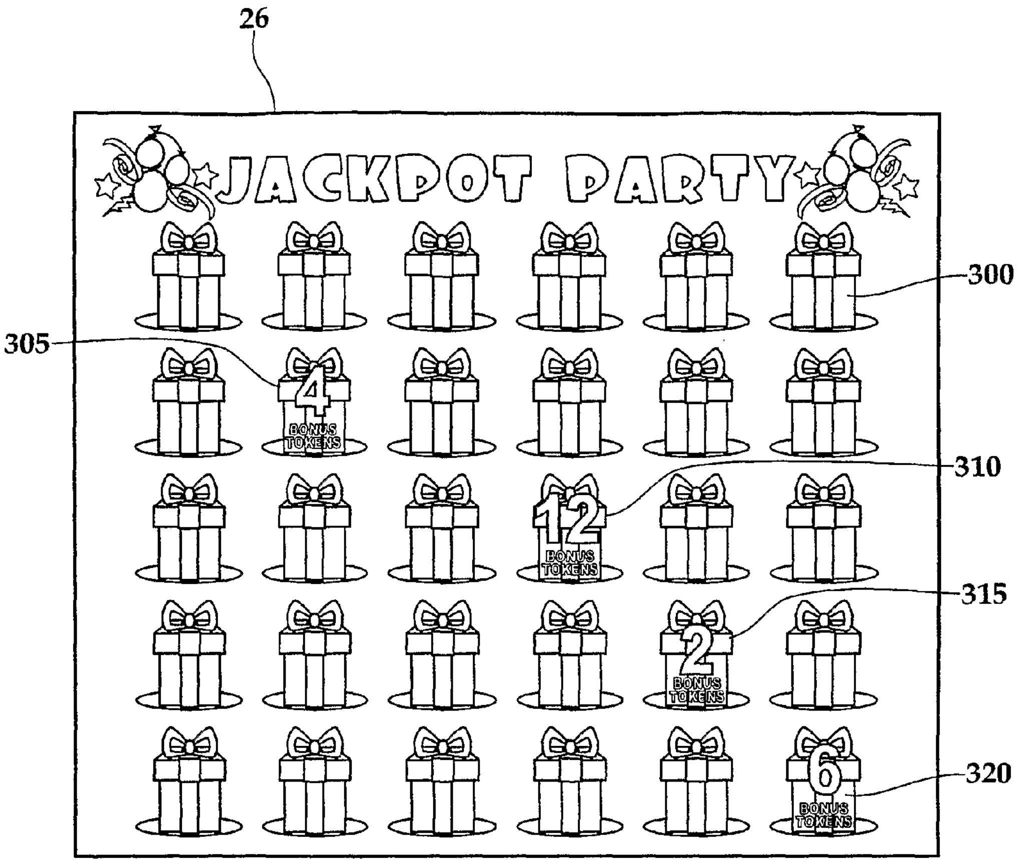
FIG. 3 illustrates a wagering game having a plurality of player-selectable elements according to an embodiment of the invention.

FIG. 3 illustrates a wagering game having a plurality of player-selectable elements 300 according to an embodiment of the invention. As shown, a matrix of five rows and six columns of the player-selectable elements 300 are displayed in a game entitled "Jackpot Party." A player is shown the array and given the chance to select some of the player-selectable elements 300. For example, the player may select four of the player-selectable elements 300. In other embodiments, more or fewer than four player-selectable elements 300 may be selected and the selection may be terminated once the player has chosen an element that reveals an end-selection symbol. The player may select each player selectable element by either touching an area of the touch screen 21 above where the selected player-selectable element 300 is displayed, or by scrolling through the player-selectable elements 300 via the push-button panel 22, for example.

As shown on the main display 26, the player selected four player-selectable elements 305, 310, 315, and 320. The first player-selectable element 305 displayed a value of "4 bonus tokens," the second player-selectable element 310 displayed a value of "12 bonus tokens," the third player-selectable element 315 displayed a value of "2 bonus tokens," and the fourth player-selectable element 320 displayed a value of "6 bonus tokens." Accordingly, the four selected player-selectable elements 305, 310, 315, and 320 reveal a total of 24 bonus tokens.

The bonus tokens may be accumulated by the player. An aspect of the invention is the portability of the bonus tokens. Specifically, when the player chooses to "cash out" of a machine and end play on the gaming terminal 10, the player may take accumulated bonus tokens along with regular credit to another gaming terminal and play the same or a different game. The bonus tokens may be entirely virtual, represented by a number on a cashout ticket, as discussed below with respect to FIG. 4. Alternatively, the bonus tokens may be stored on a smart card or in a central database, such as the memory 52 in the network 50 (FIG. 2). In other embodiments, physical bonus tokens may be distributed to the player upon cashout.

Gaming terminals 10 typically have their own mathematical models for determining the payout for a particular wager based on the game played and the combination of player-selectable elements selected by the player. These mathematical models are based on the probabilities of certain random events occurring in the game. Normally, regular credits earned by the player can be cashed out at any time (i.e., converted into cash or a cash equivalent), but bonus credits cannot be cashed out or converted to cash. An aspect of the invention is bonus tokens that may be earned by the player on one gaming terminal 10 and then transported to another gaming terminal where they are at least recognized by the second gaming terminal. Some gaming terminals may also allow the player to use bonus tokens earned on a different gaming terminal or via a different game.

The gaming terminals implement the mathematical models to determine the payouts for various games and various wagers. For example, a particular game may pay out 5 credits if the player has one credit, and may pay additional credits for each additional credit wagered, up to threshold wager limit. The game may implement a more generous payout scale if the player wagers the maximum number of credits in a game. The same is true of bonus games. The player may earn bonus tokens for a particular game based on the mathematical model for that game. The mathematical payout models for both the regular play games and the bonus games may be selected so that the player has an adequate chance to win credits/tokens, while generally ensuring that over time the operator/owner of the gaming terminal 10 will not lose money by paying out too much.

Because different gaming terminals have different mathematical payout models, a universal bonus token "economy" may be utilized to normalize/equalize the mathematical models so that bonus tokens earned on one gaming terminal or game may be recognized in another gaming terminals, and may also be used in a games implemented on some of the other gaming terminals. For example, if the player earns 10 bonus tokens on a first gaming terminal, and the player has the opportunity to exchange the 10 bonus tokens for a "free spin" in a bonus game having spinning reels, the player may choose to forgo the bonus game on the gaming terminal and instead transport the accumulated bonus tokens to a new gaming terminal having a different mathematical payout formula. For example, the player may need 15 bonus tokens to "purchase" a free spin of a different bonus game having spinning reels. However, since the free spin is more expensive on the second gaming terminal, the second gaming terminal may also have a larger potential winning payout for the player to win.

Figure 4:
FIG. 4 illustrates a cashout ticket according to an embodiment of the invention.

FIG. 4 illustrates a cashout ticket 400 according to an embodiment of the invention. As shown, the cashout ticket 400 lists the player's cashed-out monetary value of $702.00 and a bonus-token value of 24 bonus tokens. The player may redeem the $702.00 by going to a teller or a cashout machine. However, redemption of the bonus tokens may be limited to certain things. For example, the bonus tokens may only be redeemable for certain predetermined events, such as (i) a free spin in a basic games at one or more gaming terminals, (ii) playing a bonus game or a progressive game at one or more gaming terminals, (iii) acquiring a ticket for a lottery drawing similar to "Powerball," (iv) unlocking a new state or aspect of a wagering game that causes various assets or events to be available, (v) playing a wagering game with enhanced symbols that, if achieved, cause a enhanced payout that is not normally available on the wagering game, (vi) adding a multiplier to a wagering game for one or more games (or for a certain time period) with the multiplier causing any payout to be multiplied, (vii) causing an existing symbol to be a "scatter" symbol that results in a payout if that symbol appears anywhere on the display, etc. In short, the bonus tokens are not redeemable for money, but are redeemable at one or more gaming terminals to allow the player to experience a special wagering event.

Figure 5:
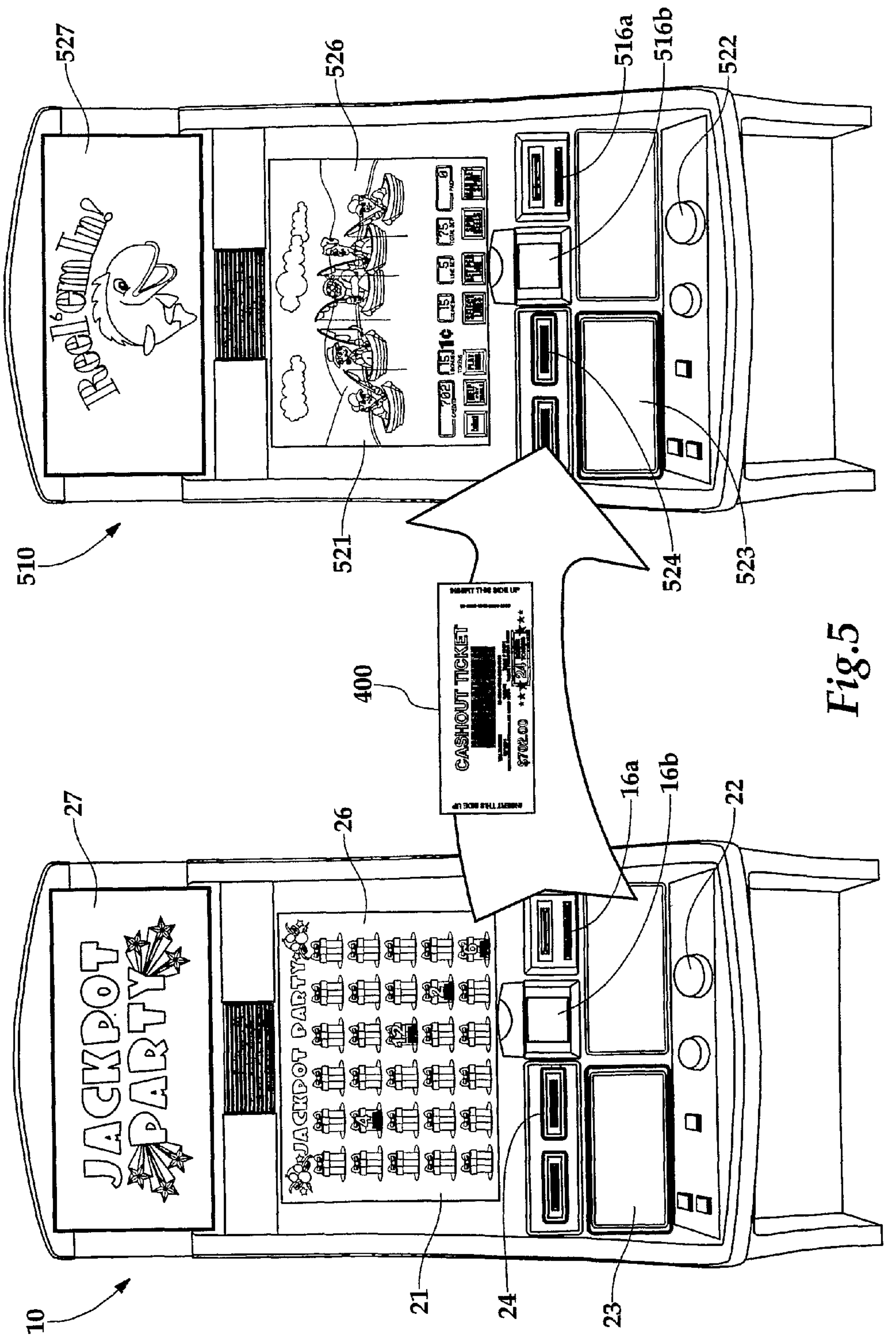
FIG. 5 illustrates the an exchange of bonus tokens on a game of the gaming terminal of FIG. 1 with a game on another gaming terminal according to an embodiment of the invention.

FIG. 5 illustrates the an exchange of bonus tokens on a game of the gaming terminal 10 of FIG. 1 with a game on another gaming terminal 510 according to an embodiment of the invention. Much like the gaming terminal 10 of FIG. 1, gaming terminal 510 may include a wager acceptor 516 (shown as a card wager acceptor **516*a* and a cash wager acceptor 516*b*), a touch screen 521, a push-button panel 522, and an information reader 524. For outputs, the gaming terminal 510 includes a payout mechanism 523, a main display 526 for displaying information about the basic wagering game, and a secondary display 527 that may display an electronic version of a pay table, and/or also possibly game-related information or other entertainment features. It should be understood that, as discussed above with FIG. 1, numerous other elements may exist and may be used in any number of combinations to create various forms of a gaming terminal 510**.

The player may accumulate the 24 bonus tokens listed on the cashout ticket 400, and the $702 payout, and bring the cashout ticket 400 over to the gaming terminal 510. At the gaming terminal 510, the player may play "Reel 'em In," another wagering game. Although "Reel 'em In" is the game displayed on the gaming terminal 510, any wagering game may be implemented on the gaming terminal 510. Even though a different game is implemented on the gaming terminal 510 than was played on gaming terminal 10, the player may still play the "Reel 'em In" game and the "Reel 'em In" game may recognize the player's bonus tokens earned in the "Jackpot Party" game played on the gaming terminal 10. Based on the mathematical model implemented by the "Reel 'em In" game, the player may use accumulated bonus tokens to purchase events on the "Reel 'em In" game, such as, for example, a free play of the "Reel 'em In" game, a free bonus game, etc. As discussed above, the bonus tokens are universal currency that may be transported from gaming terminal to gaming terminal, thereby ensuring that the player has an enjoyable time playing wagering games, and has an incentive to continue playing the wagering games.

Even though compatible gaming terminals all have the ability to recognize the accumulated bonus tokens on a cash-out ticket inserted into the wager acceptor 516, some gaming terminals may require different amounts of bonus tokens to be redeemed for certain events. For example, in the event that a gaming terminal implements a bonus game in which a player has to gather ingredients for a recipe (e.g., to make a cake), certain ingredients may be more expensive (i.e., cost more bonus tokens) than would be required in a bonus game where the player had to collect 9 players for a baseball team or monopoly pieces for a monopoly board game, to achieve a winning result. The number of bonus tokens required is based on the mathematical award model for that gaming terminal. This ensures that the payout rate of a group of gaming terminals stays below a threshold level (e.g., under 100%). It also serves to normalize the expected value of a winning result across the gaming terminals.

Figure 6:
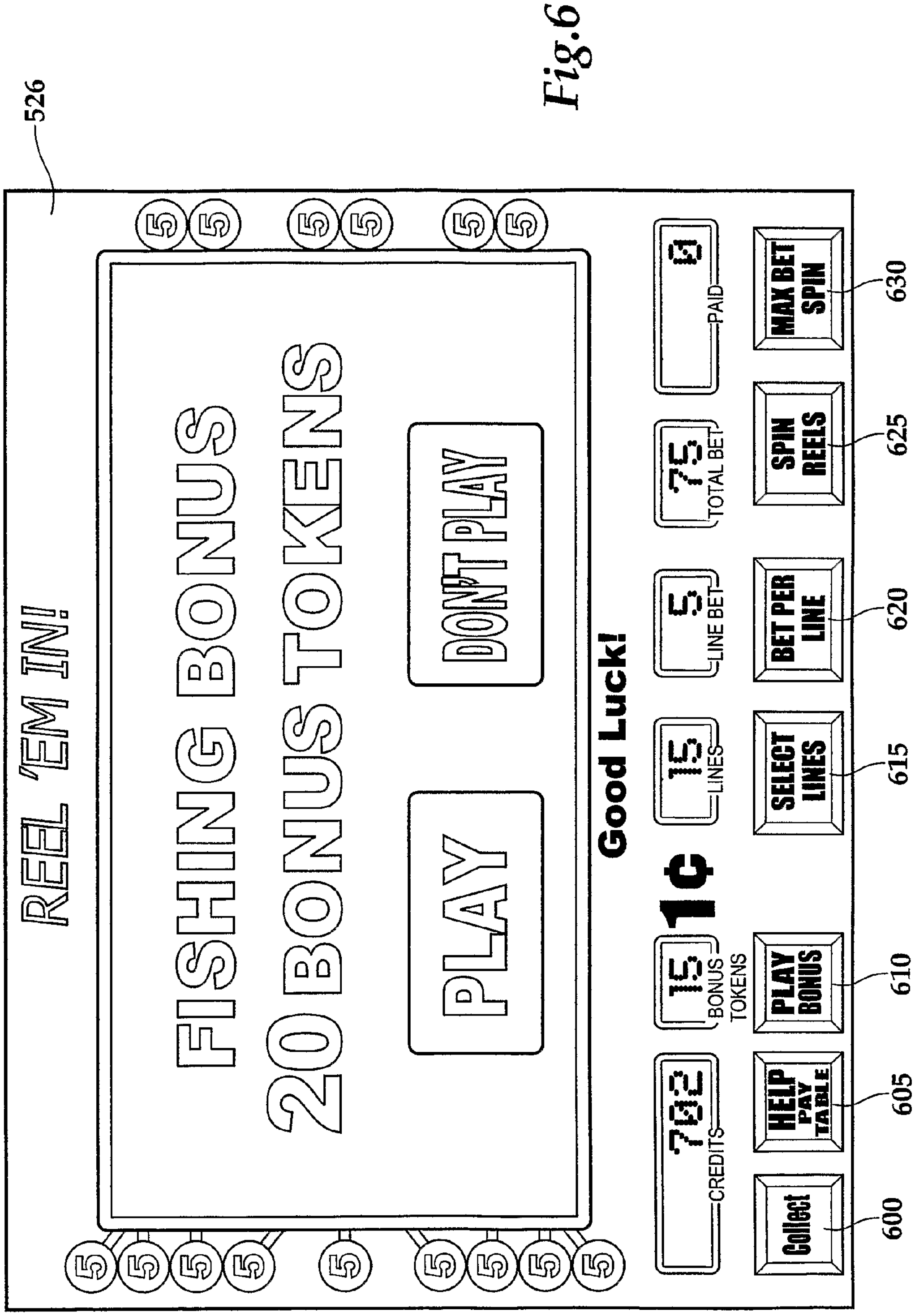
FIG. 6 illustrates a first display screen from the game of FIG. 5.

FIG. 6 illustrates a display screen 526 from the "Reel 'em In" game of FIG. 5 after the player has inserted the ticket 400 into the gaming machine 510. As shown, the main display 526 is offering the player the option to use some of his or her 24 bonus-tokens on the ticket 400 to play the bonus game associated with "Reel-Em-in." If the player clicks the displayed "play" button, the gaming terminal causes the FIG. 7 main display 526 where the player can play the bonus game of "Reel-Em-in" and can win more bonus tokens, normal credits, or both, as discussed below with respect to FIG. 7. The main display 526 also displays several other buttons, such as a "Collect" button 600, a "Help/Pay Table" button 605, a "Play Bonus" button 610, a "Select Lines" button 615, a "Bet Per Line" button 620, a "Spin Reels" button 625, and a "Max Bet Spin" button 630.

Figure 7:
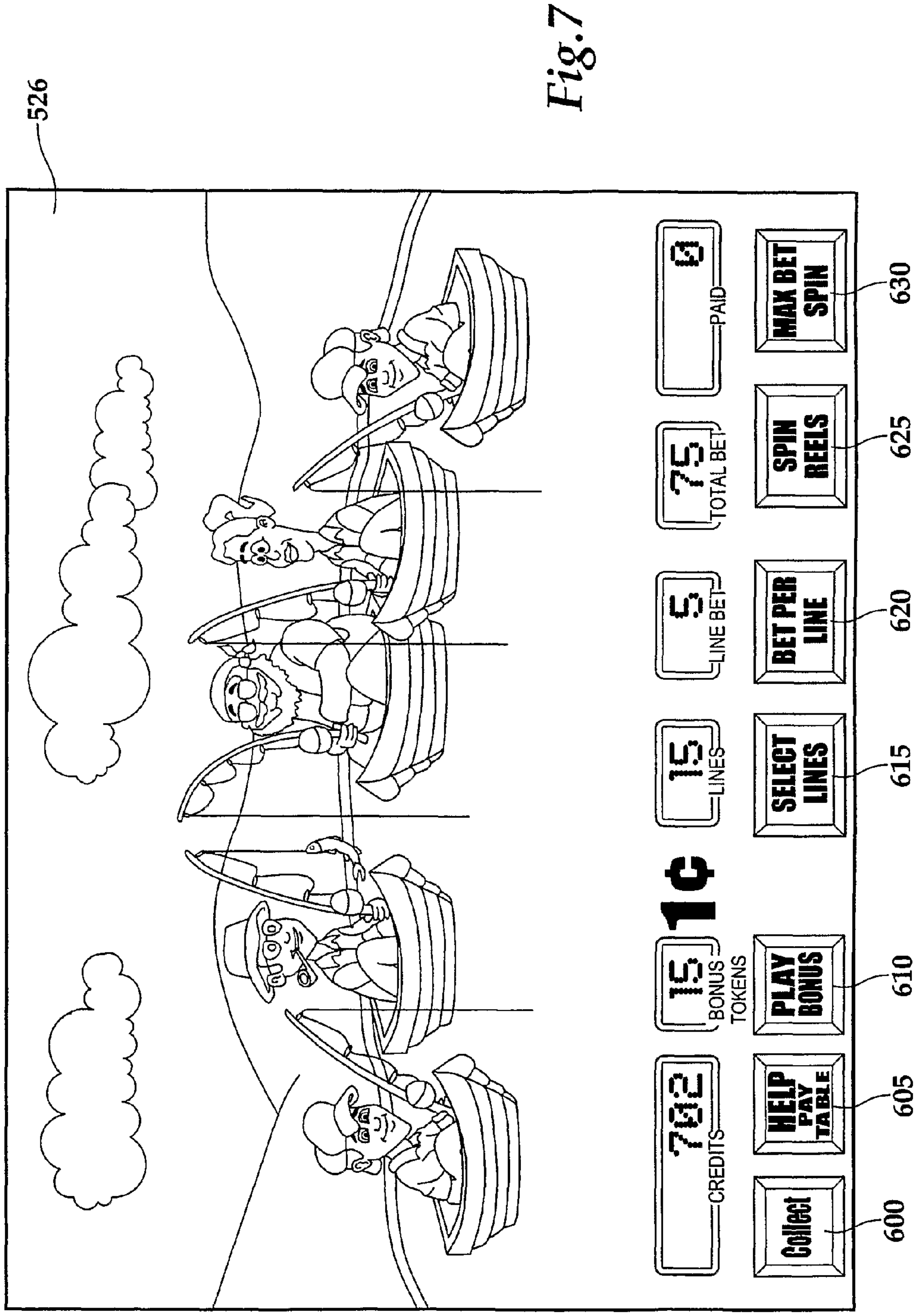
FIG. 7 illustrates another image on the display screen from a bonus game.

FIG. 7 illustrates another image on the display screen 526 from the bonus game for the "Reel 'em In" game. In this bonus game, the player selects from among the five people fishing in the displayed boats, and if a selected person has caught a certain type of fish, the player may receive bonus tokens and/or game credits, and the bonus tokens may be transported to a different gaming terminal.

Although they are exchangeable for special events, bonus tokens cannot be redeemed for cash. However, the player may purchase bonus tokens with the player's credits in some embodiments of the invention. This may be advantageous to the player when the player desires to play a bonus game but does not yet have enough bonus credits to do so.

Bonus games on different gaming terminals may have different expected values. For example, a bonus game on gaming terminal "GT 1" may have an expected value of $10.00, and a bonus game on gaming terminal "GT 2" may have an expected value of $20.00. Accordingly, when it comes to how many tokens are required to offer player a free play at the bonus game on GT2, it will typically require twice as many tokens as the bonus game at GT1. The expected value between the gaming terminals is normalized by requiring twice as many bonus tokens for the free play on GT 2 as are required on GT 1.

According to one embodiment of the present invention, the exchangeable bonus tokens are utilized within a family of interoperable game themes. The series of themes can be designed like chapters in a book except that they can circle back around, such that the final theme leads into the initial theme. For example, a plurality of game themes (e.g., themes "A," "B," "C," and "D") may include one or more specific characters that are common to some or all of the plurality of game themes. During the course of playing the basic game associated with theme A, the player collects items (e.g., pieces, tokens, credits) that are saved for use in a bonus game. Once a bonus game is initiated, however, the player can choose to play the bonus game for theme A, or may select to play the bonus game associated with theme B, C, or D. The player then uses the items collected while playing theme A's basic game in the selected theme's bonus game. At the conclusion of the bonus game, the player can choose to play the basic game associated with the selected theme or return to the prior basic game (if different).

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming terminal for playing a wagering game, comprising:

a wager-input device;

a display configured to display the wagering game, the wagering game including a randomly-selected outcome selected from a plurality of outcomes in response to a wager input received via the wager-input device, wherein the plurality of outcomes includes at least one outcome that awards standard credits and bonus tokens corresponding to a first mathematical model utilized by the gaming terminal;

a credit output device configured to selectively output a value of the standard credits and the bonus tokens in response to achieving the at least one outcome, wherein the bonus tokens are exchangeable for a special event on a second gaming terminal; and a credit input device configured to receive bonus tokens accumulated on another gaming terminal utilizing another mathematical model different from the first mathematical model utilized by the gaming terminal, wherein the gaming terminal is configured to normalize a number or a value of bonus tokens received from the another gaming terminal to thereby equalize the received number or value of bonus tokens with the first mathematical model utilized by the gaming terminal.

2. The gaming terminal according to claim 1, wherein the special event is selected from the group consisting of at least one free play of a second wagering game and a bonus game on the second gaming terminal.

3. The gaming terminal according to claim 1, wherein the special event is an acquisition of at least one player-collectable item that, upon the acquisition of a certain amount of the at least one player-collectable item, causes a payout to the player.

4. The gaming terminal according to claim 1, wherein the randomly-selected outcome is determined by a plurality of player-selectable elements, the plurality of player-selectable elements having differing values for the bonus tokens.

5. The gaming terminal according to claim 1, wherein the credit output device provides a printout of at least the bonus tokens.

6. The gaming terminal according to claim 1, wherein the credit output device provides a representation of at least the bonus tokens on at least one of a smart card and a central database.

7. The gaming terminal according to claim 1, wherein the gaming terminal awards the standard credits and the bonus tokens according to a first mathematical formula, and the second gaming terminal awards the standard credits and the bonus tokens according to a second mathematical formula that is different from the first mathematical formula.

8. The gaming terminal according to claim 7, wherein the second gaming terminal normalizes the first mathematical formula to the second mathematical formula such that bonus tokens awarded by the gaming terminal are recognized by a second wagering game on the second gaming terminal.

9. The gaming terminal according to claim 1, wherein the gaming terminal values bonus tokens according to a first mathematical formula, and the second gaming terminal values bonus tokens according to a second mathematical formula different from the first mathematical formula, the second gaming terminal normalizing the first mathematical formula to the second mathematical formula such that the value of bonus tokens received from the gaming terminal are recognized by a second wagering game on the second gaming terminal.

10. A method of conducting a wagering game on a gaming system including at least first and second gaming terminals, comprising:

- receiving a wager from a player;
- randomly selecting a game outcome from a plurality of outcomes in response to said wager, the plurality of outcomes include at least one outcome awarding standard credits and bonus tokens according to a first mathematical model;
- displaying the game outcome for the wagering game; and
- in response to the randomly selected outcome being the at least one outcome, the first gaming terminal selectively outputting a value of the accumulated standard credits and a number of the bonus tokens according to a first mathematical model;
- transmitting the bonus tokens to the second gaming terminal; and
- normalizing the bonus tokens such that at least one of a number of or value of bonus tokens are made to comport with a second mathematical model employed in association with the second gaming terminal.

11. The method according to claim 10, wherein the special event is selected from the group consisting of at least one free play of a second wagering game and a bonus game on the second gaming terminal.

12. The method according to claim 10, wherein the special event is an acquisition of at least one player-collectable items that, upon the acquisition of a certain amount of the at least one player-collectable items, causes a payout to the player.

13. The method according to claim 10, wherein the method is implemented on a gaming terminal adapted to accept bonus tokens issued from the second gaming terminal.

14. The method according to claim 10, wherein the randomly-selected outcome is determined by a plurality of player-selectable elements, the plurality of player-selectable elements having differing values for the bonus tokens.

15. The method according to claim 10, wherein a credit output device provides a printout of at least the bonus tokens.

16. The method according to claim 10, wherein a credit output device provides a representation of at least the bonus tokens on at least one of a smart card and a central database.

17. The method according to claim 10, wherein the act of normalizing the bonus tokens occurs in the second gaming terminal.

18. The method according to claim 10, wherein the act of normalizing includes normalizing the first mathematical model to the second mathematical model such that the value of bonus tokens received from the first gaming terminal are recognized by a second wagering game on the second gaming terminal.

19. A gaming system, comprising:

- a first gaming terminal playing a first wagering game, the first wagering game including a randomly-selected outcome selected from a plurality of outcomes in response to a wager input received from a player, one of the plurality of outcomes including at least one bonus-token outcome, the first wagering game also including a special event that is activatable in response to the player achieving a first predetermined value of the bonus tokens as determined according to a first mathematical formula, and wherein in response to the player achieving the bonus-token outcome, the first gaming terminal selectively providing the player with bonus tokens redeemable only for non-monetary events; and
- a second gaming terminal playing a second wagering game that is different from the first wagering game, the second wagering game including a randomly-selected outcome selected from a plurality of outcomes, the second wagering game also including a special event that is activatable in response to the player presenting a second predetermined value of the bonus tokens to the second gaming terminal, wherein the second predetermined value of bonus tokens is determined according to a second mathematical formula different from the first mathematical formula;
- wherein the second gaming terminal normalizes the first mathematical formula to the second mathematical formula such that bonus tokens received by the second gaming terminal from the first gaming terminal are recognized by the second wagering game such that the special event is activated in response to the player presenting the second predetermined value of bonus tokens to the second gaming terminal.

* * * * *

UNITED STATES PATENT AND TRADEMARK OFFICE

CERTIFICATE OF CORRECTION

PATENT NO. : 8,628,405 B2
APPLICATION NO. : 11/664773
DATED : January 14, 2014
INVENTOR(S) : Gelber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 927 days.

Signed and Sealed this
Twenty-second Day of September, 2015

Michelle K. Lee
*Director of the United States Patent and Trademark Office*